US010951916B2

(12) United States Patent
Lim et al.

(10) Patent No.: US 10,951,916 B2
(45) Date of Patent: Mar. 16, 2021

(54) APPARATUS AND METHOD FOR VIDEO ENCODING OR DECODING

(71) Applicant: SK TELECOM CO., LTD., Seoul (KR)

(72) Inventors: Jeong-yeon Lim, Seoul (KR); Se-hoon Son, Seoul (KR); Sun-young Lee, Seoul (KR); Jae-seob Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/558,914

(22) Filed: Sep. 3, 2019

(65) Prior Publication Data

US 2019/0394487 A1 Dec. 26, 2019

Related U.S. Application Data

(63) Continuation of application No. PCT/KR2018/002537, filed on Mar. 2, 2018.

(30) Foreign Application Priority Data

Mar. 3, 2017 (KR) .................. 10-2017-0027941
Mar. 30, 2017 (KR) .................. 10-2017-0041140

(51) Int. Cl.
*H04N 19/593* (2014.01)
*H04N 19/70* (2014.01)
(Continued)

(52) U.S. Cl.
CPC ......... *H04N 19/593* (2014.11); *H04N 19/119* (2014.11); *H04N 19/176* (2014.11); *H04N 19/70* (2014.11)

(58) Field of Classification Search
USPC ................................... 375/240.12
See application file for complete search history.

(56) References Cited

U.S. PATENT DOCUMENTS 9,584,819 B2  2/2017  Takano
2013/0101035 A1*  4/2013  Wang .............. H04N 19/70
375/240.12
(Continued)

FOREIGN PATENT DOCUMENTS

KR  10-1354086 B1  1/2014
KR  10-2014-0085539 A  7/2014
(Continued)

OTHER PUBLICATIONS

International Search Report dated Jun. 4, 2018, in connection with counterpart International Patent Application No. PCT/KR2018/002537.

*Primary Examiner* — Behrooz M Senfi
(74) *Attorney, Agent, or Firm* — Hauptman Ham, LLP

(57) ABSTRACT

The present disclosure relates to video encoding or decoding for splitting a picture into a plurality of tiles in order to encode video efficiently. In one aspect of the present disclosure, a video encoding method for encoding a picture split into a plurality of tiles includes encoding first information indicating whether to merge some of the plurality of tiles; when the first information is encoded to indicate tile merging, generating one or more merge tiles by merging some of the plurality of tiles, each of the merge tiles being defined as one tile; encoding second information indicating tiles merged into each of the merge tiles among the plurality of tiles; and encoding each of the merge tiles as one tile without restriction on encoding dependencies between the tiles merged into each of the merge tiles.

10 Claims, 12 Drawing Sheets

(51) Int. Cl.
*H04N 19/176* (2014.01)
*H04N 19/119* (2014.01)

(56) References Cited

U.S. PATENT DOCUMENTS

| | | | |
|---|---|---|---|
| 2014/0355677 A1* | 12/2014 | Kondo | H04N 19/132 |
| | | | 375/240.12 |
| 2015/0181218 A1* | 6/2015 | Okawa | H04N 19/513 |
| | | | 375/240.16 |
| 2016/0261868 A1* | 9/2016 | Chien | H04N 19/70 |
| 2018/0192076 A1* | 7/2018 | Ikai | H04N 19/70 |
| 2019/0166376 A1* | 5/2019 | Thomas | H04N 19/436 |

FOREIGN PATENT DOCUMENTS

| | | |
|---|---|---|
| KR | 10-1599879 B1 | 3/2016 |
| KR | 10-1641716 B1 | 7/2016 |
| WO | 2013-063094 A1 | 5/2013 |

\* cited by examiner

| 0  | 1  | 2  | 3  |
|----|----|----|----|
| 4  | 5  | 6  | 7  |
| 8  | 9  | 10 | 11 |
| 12 | 13 | 14 | 15 |

FIG. 5

| (0,0) | (0,1) | (0,2) | (0,3) |
|-------|-------|-------|-------|
| (1,0) | (1,1) | (1,2) | (1,3) |
| (2,0) | (2,1) | (2,2) | (2,3) |
| (3,0) | (3,1) | (3,2) | (3,3) |

FIG. 6

| 0 | 0 | 0 | 0 |
|---|---|---|---|
| 0 | 1 | 1 | 0 |
| 0 | 1 | 1 | 0 |
| 0 | 0 | 0 | 0 |

*FIG. 7*

| 0 | 1 | 2 | 3 |
|---|---|---|---|
| 4 | 5 | 6 | 7 |
| 8 | 9 | 10 | 11 |
| 12 | 13 | 14 | 15 |

*FIG. 8*

| (0,0) | (0,1) | (0,2) | (0,3) |
|-------|-------|-------|-------|
| (1,0) | (1,1) | (1,2) | (1,3) |
| (2,0) | (2,1) | (2,2) | (2,3) |
| (3,0) | (3,1) | (3,2) | (3,3) |

*FIG. 9*

| 0 | 10 | 10 | 0 |
|---|----|----|---|
| 0 | 11 | 11 | 0 |
| 0 | 11 | 11 | 0 |
| 0 | 0  | 0  | 0 |

*FIG. 10*

| 0 | 10  | 10  | 0 |
| 0 | 110 | 110 | 0 |
| 0 | 110 | 110 | 0 |
| 0 | 0   | 0   | 0 |

*FIG. 11*

APPARATUS AND METHOD FOR VIDEO ENCODING OR DECODING

CROSS-REFERENCE TO RELATED APPLICATION

The present application is a continuation of PCT/KR20181002537 filed on Mar. 2, 2018, which is based on and claims priority Korean Patent Application No. 10-2017-0027941, filed on Mar. 3, 2017, and Patent Application No. 10-2017-0041140, filed on Mar. 30, 2017 in Korea. The disclosures of above-listed applications are hereby incorporated by reference herein in their entirety.

TECHNICAL FIELD

The present disclosure relates to video encoding or decoding for splitting a picture into a plurality of tiles in order to encode video efficiently.

BACKGROUND ART

The statements in this section merely provide background information related to the present disclosure and may not constitute prior art.

Recently, video size, resolution, and frame rate are gradually increasing, and there is increasing demand for video content such as games or 360-degree video (hereinafter referred to as "360° video") in addition to existing 2D natural images generated by cameras.

360° video is images captured in various directions using a plurality of cameras. In order to compress and transmit video of various scenes, images output from multiple cameras are stitched into one 2D image. The stitched image is compressed and transmitted to a decoding apparatus. The decoding apparatus decodes the compressed image and then maps the decoded image to a 3D space to reproduce the image. The 360° video can be transformed into various projection formats according to the coding formats so as to be encoded. Examples of projection formats include Equirectangular Projection, Cube Map Projection, and Truncated Square Pyramid Projection.

In the case of 360° video, images displayed on the screen must change according to change in the user's viewpoint, and therefore there is a limit to improving coding efficiency according to conventional compression techniques, which are based on 2D video. In order to enhance video encoding and decoding efficiency of 360° video, video needs to be encoded and decoded by setting a region of interest (ROI) in the projected video of 360° video according to the user's viewpoint and differentiating image qualities of the ROI and the other region. To this end, a structure (e.g., a tile structure) capable of splitting a picture into multiple regions and independently encoding and decoding each region is needed. However, the picture splitting structure according to the conventional compression techniques is not flexible enough to set an ROI.

SUMMARY

Technical Problem

Therefore, the present disclosure has been made in view of the above problems, and it is an object of the present invention to provide a method and apparatus for video encoding and decoding which are capable of addressing a spacing issue at a tile boundary improving encoding efficiency.

Technical Solution

In accordance with one aspect of the present disclosure, provided is a video encoding method for encoding a picture split into a plurality of tiles, the method including encoding first information indicating whether to merge some of the plurality of tiles; when the first information is encoded to indicate tile merging, generating one or more merge tiles by merging some of the plurality of tiles, each of the merge tiles being defined as one tile; encoding second information indicating tiles merged into each of the merge tiles among the plurality of tiles; and encoding each of the merge tiles as one tile without restriction on encoding dependencies between the tiles merged into each of the merge tiles.

In accordance with another aspect of the present disclosure, provided is a video decoding method for decoding a picture split into a plurality of tiles, the method including decoding first information indicating whether to merge some of the plurality of tiles from a bitstream; when the decoded first information indicates tile merging, decoding second information indicating tiles to be merged among the plurality of tiles from the bitstream; and generating one or more merge tiles by merging the tiles indicated by the second information, each of the merge tiles being defined as one tile; and decoding each of the merge tiles as one tile without restriction on decoding dependencies between the tiles merged into each of the merge tiles.

DESCRIPTION OF DRAWINGS

FIG. 5 is an exemplary diagram marking identification information of tiles on a picture including a plurality of tiles among which some tiles are merged.

FIG. 6 is an exemplary diagram marking position information of tiles on a picture including a plurality of tiles among which some tiles are merged.

FIG. 7 is an exemplary diagram marking information about whether each tile is merged, on a picture including a plurality of tiles among which some tiles are merged.

FIG. 8 is an exemplary diagram marking identification information of tiles on a picture including a plurality of merge tiles.

FIG. 9 is an exemplary diagram marking position information of tiles on a picture including a plurality of merge tiles.

FIG. 10 is an exemplary diagram marking information about whether each tile is merged and indexes of merge tiles, on a picture including a plurality of merge tiles.

FIG. 11 is another exemplary diagram marking information about whether each tile is merged and indexes of merge tiles, on a picture including a plurality of merge tiles.

BEST MODE

Figure 1:
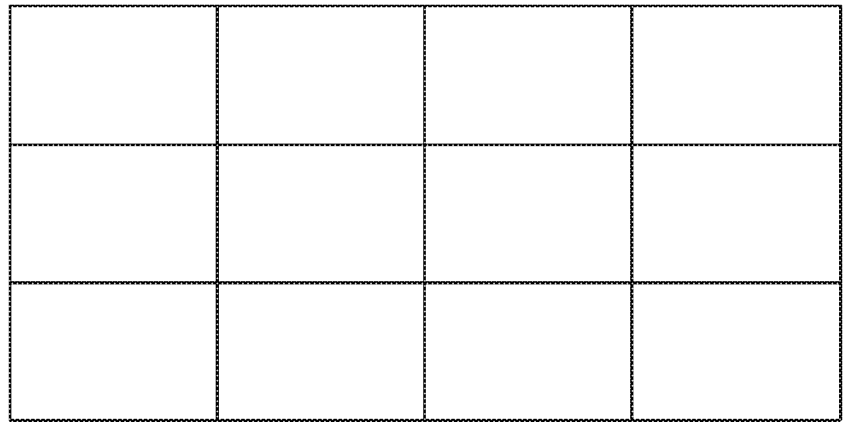
FIG. 1 is an exemplary view of a picture split into a plurality of tiles and encoded.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

FIG. 1 is an exemplary view of a picture split into a plurality of tiles and encoded.

Figure 2:
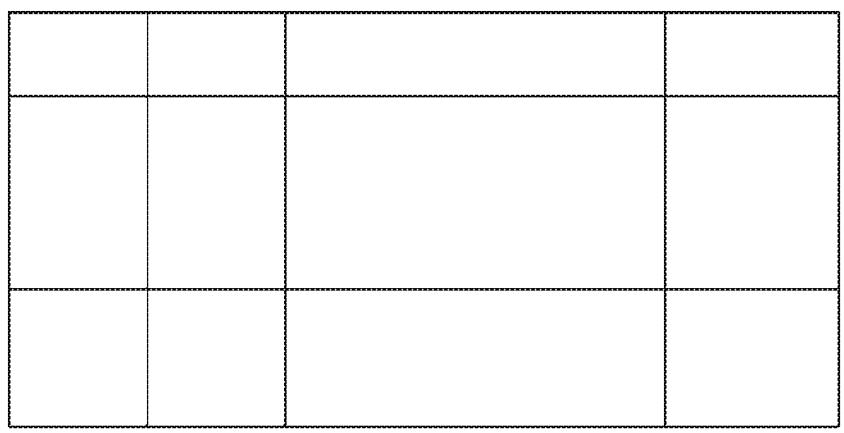
FIG. 2 is another exemplary view of a picture split into a plurality of tiles and encoded.

FIG. 2 is another exemplary view of a picture split into a plurality of tiles and encoded.

In the High Efficiency Video Coding (HEVC) standard, a picture can be split into a plurality of tiles which are rectangular regions. A picture may be split into one or more columns of tiles, split into one or more rows of tiles, or split into one or more columns and one or more rows of tiles. The picture may be uniformly split into tiles of the same size or may be split into tiles of different sizes, based on the lengths of the row and column. However, the rows should have the same number of tiles and the columns should have the same number of tiles.

When a picture is split into a plurality of tiles, each tile may be encoded and decoded independently of the other tiles. Here, independence means that all encoding and decoding processes for each tile which include intra prediction, inter prediction, transform, quantization, entropy, and filtering can be performed regardless of those for the other tiles. However, this does not mean that all encoding and decoding processes are completely independently performed on each tile. In inter prediction or in-loop filtering, a tile may be encoded and decoded selectively using information about other tiles.

An example of a high level syntax for tiles is shown in Table 1.

TABLE 1

```
pic_parameter_set_rbsp( ) {
   ...
   tiles_enabled_flag
   ....
   if(tiles_enable_flag) {
      num_tile_columns_minus1
      num_tile_rows_minus1
      uniform_spacing_flag
      if(!uniform_spacing_flag) {
         for( i = 0; i < num_tile_columns_mnus1;i++ )
            column_width_minus1[ i ]
         for( i = 0; i < num_tile_rows_minus1;i++ )
            row_height_minus1[ i ]
      }
      loop_filter_across_tiles_enabled_flag
   }
```

Table 1 shows tiles_enabled_flag, which is a flag indicating an on/off state of a tile function in the picture parameter set (PPS), and multiple syntaxes for specifying the size of tiles when the flag is set in an On state. The table also shows num_tile_columns_minus1, which has a value obtained by subtracting 1 from the number of tiles vertically split from the picture, num_tile_rows_minus1, which has a value obtained by subtracting 1 from the number of tiles horizontally split from the picture, and uniform_spacing_flag, which is a flag indicating that the picture are uniformly split into the tiles on the horizontal and vertical axes. When the pictures are not uniformly split on the horizontal and vertical axes (uniform_spacing_flag=off), the width information (column_width_minus1) about each tile based on the horizontal axis and the height information (row_height_minus1) about each tile based on the vertical axis are additionally transmitted. Lastly, a flag (loop_filter_across_tiles_enabled_flag) indicating whether a loop filter is executed in a boundary region between tiles is transmitted. FIG. 1 shows an exemplary picture split into tiles of the same size when uniform_spacing_flag is set to On. FIG. 2 shows an exemplary picture split into tiles of different sizes when uniform_spacing_flag is set to Off.

When an ROI is set, such conventional tile structures have a limitation in processing the ROI and the region outside the ROI according to the characteristics of the respective regions. The ROI should be encoded with higher image quality than the other regions. However, when the ROI is split into a plurality of tiles, the image quality may be deteriorated due to spacing at the tile boundaries and the like. Therefore, the ROI is preferably set as one tile rather than being split into a plurality of tiles. The regions other than the ROI are preferably set as a plurality of tiles having a small size so as to be flexibly processed according to change in viewpoint even if the image quality is somewhat lowered.

In the present disclosure, a tile structure in an irregular pattern is defined. Thus, tiles can be flexibly configured unlike the conventional tile structure (in which each row of the picture should have the same number of tiles and each column should have the same number of tiles). Accordingly, the method and apparatus for video encoding and decoding proposed in the present disclosure may address the issue of spacing at a tile boundary within the ROI and improve encoding efficiency.

As used herein, the term "tile" means a split region from a picture. The tile may be used as a tool for encoding and decoding each region independently (but the tile may selectively have dependency in inter prediction or loop filtering). In the encoding processes such as intra prediction, except for inter prediction and loop filtering, dependencies between a "tile" and the other tiles are restricted. In the present disclosure, the term "tile" can be replaced with other terms having the same meaning (e.g., area, region).

Figure 3:
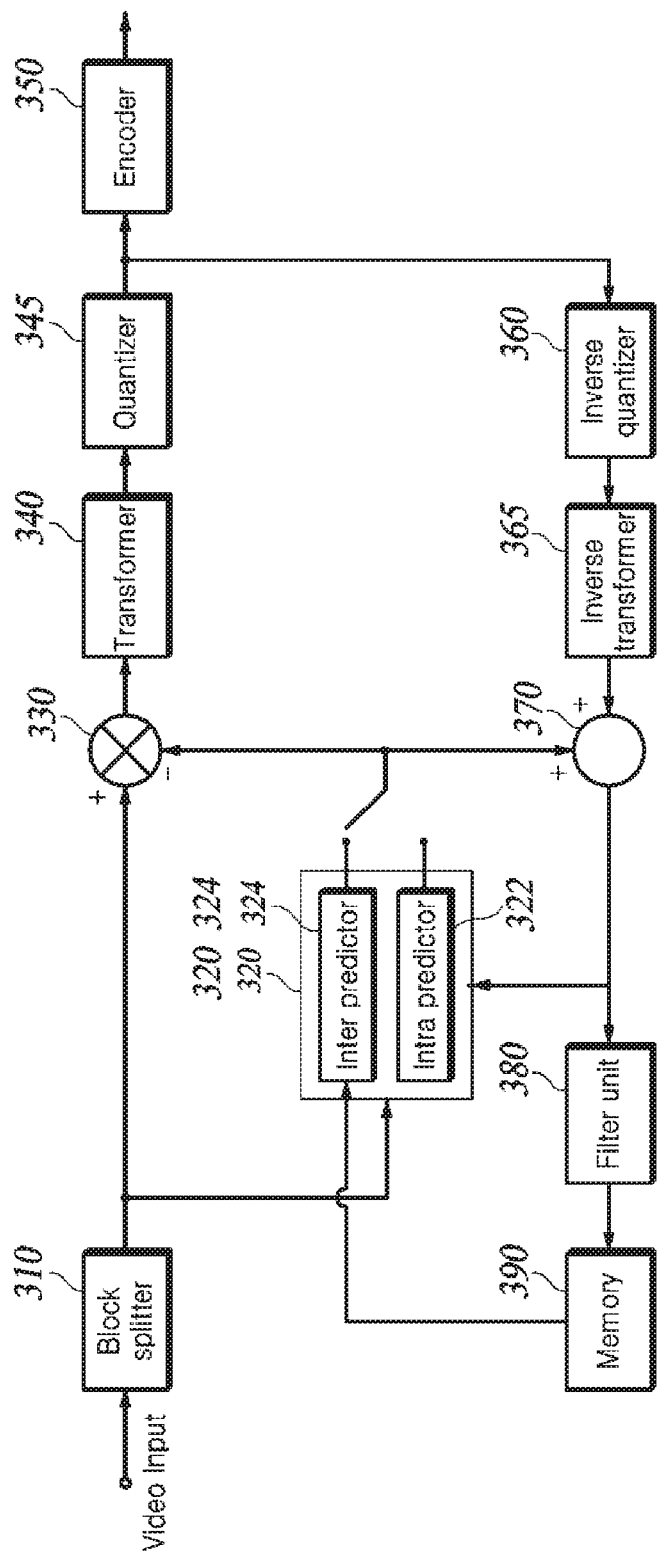
FIG. 3 is a block diagram of a video encoding apparatus according to an embodiment of the present disclosure.

FIG. 3 is a block diagram of a video encoding apparatus according to an embodiment of the present disclosure.

The encoding apparatus includes a block splitter 310, a predictor 320, a subtractor 330, a transformer 340, a quantizer 345, an encoder 350, an inverse quantizer 360, an inverse transformer 365, an adder 370, a filter unit 380, and a memory 390. Each element of the encoding apparatus may be implemented as a hardware chip, or may be implemented as software and the microprocessor may be implemented to execute the functions of the software corresponding to the respective elements.

The block splitter 310 splits each picture constituting video into a plurality of tiles. Then, the block splitter 310 splits each of the tiles into a plurality of coding tree units (CTUs), and then recursively splits the CTUs using a tree structure. In the tree structure, a leaf node is a coding unit (CU), which is a basic unit of encoding. A QuadTree (QT)

structure, in which a node is split into four sub-nodes, or a QuadTree plus BinaryTree (QTBT) structure combining the QT structure and a BinaryTree (BT) structure in which a node is split into two sub-nodes, may be used as the tree structure.

In the present disclosure, the block splitter 310 defines an irregular or flexible tile structure by splitting a picture into a plurality of tiles and merging some of the tiles to generate one or more merge tiles. Each merge tile is defined as one tile. Details will be described later with reference to other drawings.

The predictor 320 generates a prediction block by predicting a current block. The predictor 320 includes an intra predictor 322 and an inter predictor 324. Here, the current block, which is a basic unit of encoding corresponding to a leaf node in the tree structure, refers to a CU to be encoded at present. Alternatively, the current block may be one of a plurality of sub-blocks into which the CU is split.

The intra predictor 322 predicts pixels in the current block using pixels (reference samples) located around the current block in a current picture including the current block. There are plural intra prediction modes according to the prediction directions, and the neighboring pixels to be used and the calculation equation are defined differently according to each prediction mode.

The inter predictor 324 searches for a block most similar to the current block in a reference picture encoded and decoded earlier than the current picture, and generates a prediction block for the current block using the searched block. Then, the inter predictor generates a motion vector corresponding to a displacement between the current block in the current picture and the prediction block in the reference picture. Motion information including information about the reference picture used to predict the current block and information about the motion vector is encoded by the encoder 350 and transmitted to the video decoding apparatus.

The subtractor 330 subtracts the prediction block generated by the intra predictor 322 or the inter predictor 324 from the current block to generate a residual block.

The transformer 340 transforms residual signals in the residual block having pixel values in the spatial domain into transform coefficients in the frequency domain. The transformer 340 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 345 quantizes the transform coefficients output from the transformer 340 and outputs the quantized transform coefficients to the encoder 350.

The encoder 350 encodes the quantized transform coefficients using a coding scheme such as CABAC to generate a bitstream. The encoder 350 encodes merge information for defining an irregular or flexible tile structure by merging some of the tiles into which a picture is split, thereby allowing the video decoding apparatus to define the same tile structure as the video encoding apparatus. The merge information includes first information indicating whether to merge some of the plurality of tiles and second information indicating the tiles to be merged into each merge tile among the plurality of tiles. Third information indicating the number of merge tiles may be further included in the merge information. Syntax elements related to the merge information may be configured at predetermined positions in one or more of a sequence parameter set (SPS), a picture parameter set (PPS), supplementary enhancement information (SEI), and a slice header.

The encoder 350 encodes information about the size of a CTU positioned at the uppermost layer of the tree structure and the splitting information for block partition from the CTU in a tree structure, such that the video decoding apparatus can split the block in the same manner as the video encoding apparatus. For example, in the case of QT splitting, QT splitting information indicating whether the block of an upper layer is split into four blocks of the lower layer is encoded. In the case of BT splitting, the encoder encodes BT splitting information indicating whether each block is split into two blocks and indicating the split type, starting with a block corresponding to a leaf node of QT.

The encoder 350 encodes information about a prediction type indicating whether the current block is encoded by intra prediction or inter prediction, and encodes intra prediction information or inter prediction information according to the prediction type.

The inverse quantizer 360 inversely quantizes the quantized transform coefficients output from the quantizer 345 to generate transform coefficients. The inverse transformer 365 transforms the transform coefficients output from the inverse quantizer 360 from the frequency domain to the spatial domain to reconstruct the residual block.

The adder 370 adds the reconstructed residual block to the prediction block generated by the predictor 320 to reconstruct the current block. The pixels in the reconstructed current block are used as reference samples in performing intra prediction of the next block in order.

The filter unit 380 deblock-filters the boundaries between the reconstructed blocks in order to remove blocking artifacts caused by block-by-block encoding/decoding and stores the blocks in the memory 390. When all the blocks in one picture are reconstructed, the reconstructed picture is used as a reference picture for inter prediction of a block in a subsequent picture to be encoded.

Hereinafter, a video encoding method for defining an irregular or flexible tile structure by generating one or more merge tiles by merging some of a plurality of tiles will be described in detail.

Figure 4:
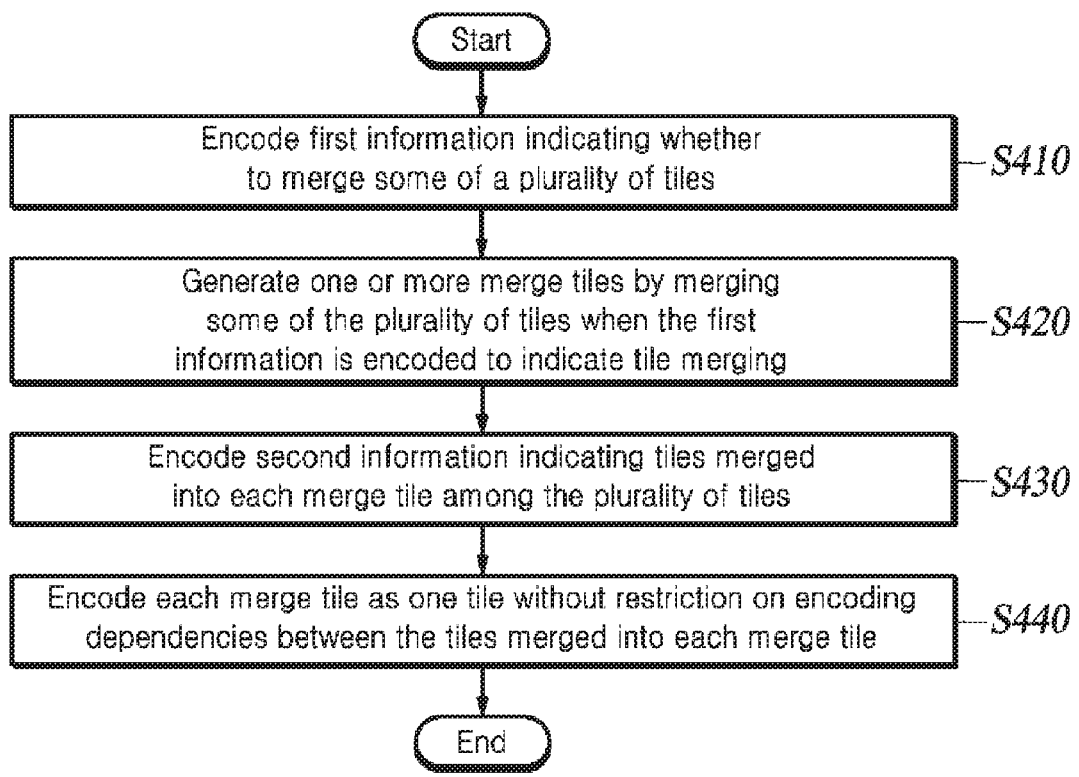
FIG. 4 is a flowchart illustrating operation of a video encoding apparatus according to an embodiment of the present disclosure.

FIG. 4 is a flowchart illustrating operation of a video encoding apparatus for encoding a picture split into a plurality of tiles.

The video encoding apparatus encodes first information indicating whether to merge some of a plurality of tiles (S410). For example, as the first information, a flag merge_tile_enabled_flag indicating whether to merge a tile may be used. The flag merge_tile_enabled_flag may be encoded with the indication of On when some tiles are merged. The flag merge_tile_enabled_flag may be encoded with the indication of Off when there is no tile to be merged.

When the first information indicating whether to merge tiles is encoded to indicate merging of tiles, the video encoding apparatus generates one or more merge tiles by merging some of the plurality of tiles (S420). Each generated merge tile is defined as one tile. In other words, tiles to be merged into each merge tile are not simply grouped while maintaining the characteristics thereof before merging, but are merged into a single tile. For example, merging may be performed in a manner that a restriction on encoding dependencies between tiles merged into each merge tile is eliminated.

After generating one or more merge tiles, the video encoding apparatus encodes second information indicating tiles which are merged into each merge tile among a plurality of tiles (S430). The second information may include, for each of merge tiles, i) identification information of the start and end tiles among the tiles merged into each merge tile, ii) position information about the start and end tiles among the tiles merged into each merge tile, or iii) information indicating whether each of the plurality of tiles is merged. The second information may include iv) index information about each of one or more merge tiles into which tiles are merged. A specific example of the second information will be described with reference to other drawings later.

The video encoding apparatus may additionally encode third information indicating the number of the generated one or more merge tiles.

The video encoding apparatus encodes each merge tile as one tile without restriction on encoding dependencies between the tiles merged into each merge tile (S440). Here, the encoding dependencies may include intra prediction dependency between the tiles merged into each merge tile. That is, the restriction on intra prediction dependency is eliminated between the tiles merged into the same merge tile.

Hereinafter, exemplary syntax elements for merge tiles will be described with reference to FIGS. 5 to 12.

Embodiment #1

FIG. 5 is an exemplary diagram marking identification information of tiles on a picture including a plurality of tiles among which some tiles are merged.

FIG. 5 illustrates a case where a picture is split into 16 tiles of the same size, and tile indexes from 0 to 15 are assigned to the respective tiles as identification information. In this case, tile 5, tile 6, tile 9, and tile 10 are merged to generate one merge tile.

In this embodiment, the video encoding apparatus encodes merge_tile_enabled_flag with the indication of On as the first information indicating that some of a plurality of tiles should be merged. The apparatus encodes identification information of the start and end tiles among the tiles to be merged as the second information indicating the tiles merged into a merge tile. When there is a plurality of merge tiles, the identification information of the start and end tiles are encoded for each of the merge tiles.

The identifier topleft_tile_id of the top left tile may be encoded as the identification information of the start tile among the tiles merged into the merge tile, and the identifier bottomright_tile_id of the bottom right tile may be encoded as the identification information of the end tile. In the example of FIG. 5, the identifications are encoded as topleft_tile_id=5, bottomright_tile_id=10. However, this is merely an example, and various syntax elements that can define the start and end tiles may be used. For example, among the tiles to be merged, the identifier of the top right tile may be used as the tile identification information of the start tile, and the identifier of the bottom left tile may be used as the identification information of the end tile.

An example of syntax elements according to this embodiment is shown in Table 2.

TABLE 2

```
pic_parameter_set_rbsp( ) {
    ...
    tiles_enabled_flag
    ...
    if( tiles_enabled_flag ) {
        num_tile_columns_minus1
        num_tile_rows_minus1
        uniform_spacing_flag
        if( !uniform_spacing_flag) {
            for (i=0; i < num_tile_columns_minus1;i++ )
                column_width_minus1[ i ]
            for( i=0; i < num_tile_rows_minus1;i++ )
                row_height_minus1[ i ]
        }
        merge_tile_enabled_flag
        if(merge_til_enabled_flag) {
            topleft_tile_id
            bottomright_tile_id
        }
        loop_filter_across_tiles_enabled_flag
    }
```

Embodiment #2

FIG. 6 is an exemplary diagram marking position information of tiles on a picture including a plurality of tiles among which some tiles are merged.

In the example of FIG. 6, a picture is split into 16 tiles of the same size as in the case of FIG. 5, and tiles at the center of the picture are merged into one merge tile. This figure shows position information about the tiles in place of the identification information of the tiles. For example, position information about a tile may be represented by coordinates (u, v) based on the row and column of the tile. When the position of the top row is set to 0 (u=0) and the position of the leftmost column is set to 0 (v=0), the coordinate of the tiles may be sequentially presented as shown in FIG. 5.

In this embodiment, the video encoding apparatus encodes merge_tile_enabled_flag with the indication of On as the first information indicating that some of a plurality of tiles should be merged. The apparatus encodes position information about the start tile and the end tile among the tiles to be merged as the second information indicating the tiles merged into a merge tile. When there is a plurality of merge tiles, the position information about the start tile and the position information about the end tile are encoded for each of the merge tiles.

The position information about the top left tile (u_start_pos and v_start_pos) may be encoded as the position information about the start tile among the tiles to be merged into a merge tile, and the position information about the bottom right tile (u_end_pos and v_end_pos) may be encoded as the position information about the end tile. In the example of FIG. 6, the position information is encoded as u_start_pos=1, v_start_pos=1, u_end_pos=2, v_end_pos=2. However, this is merely an example, and various syntax elements that can define the start and end tiles may be used. For example, among the tiles to be merged, the position information about the top right tile may be used as the position information about the start tile, and the position information about the bottom left tile may be used as the position information about the end tile.

An example of syntax elements according to this embodiment is shown in Table 3.

TABLE 3

```
pic_parameter_set_rbsp( ) {
  ...
  tiles_enabled_flag
  ...
  if( tiles_enabled_flag ) {
    num_tile_columns_minus1
    num_tile_rows_minus1
    uniform_spacing_flag
    if( !uniform_spacing_flag) {
      for( i=0; i < num_tile_columns_minus1;i++ )
        column_width_minus1[ i ]
      for ( i=0; i < num_tile_rows_minus1;i++ )
        row_height_minus1[ i ]
    }
    merge_tile_enabled_flag
    if(merge_tile_enabled_flag) {
      u_start_pos
      v_start_pos
      u_end_pos
      v_end_pos
    }
    loop_filter_across_tiles_enabled_flag
  }
```

The order of the syntax elements u_start_pos, v_start_pos, u_end_pos, v_end_pos is not necessarily set as shown in Table 3, but may be changed, if necessary.

Embodiment #3

FIG. 7 is an exemplary diagram marking information about whether each tile is merged, on a picture including a plurality of tiles among which some tiles are merged.

In the example of FIG. 7, a picture is split into 16 tiles of the same size as in the case of FIGS. 5 and 6, and tiles at the center of the picture are merged into one merge tile. In addition, information indicating whether a tile is merged into a merge tile is shown for each of the tiles into which the picture is split.

In this embodiment, the video encoding apparatus encodes merge_tile_enabled_flag with the indication of On as the first information indicating that some of a plurality of tiles should be merged. The apparatus encodes information about each tile indicating whether the tile is merged into a merge tile as the second information indicating the tiles to be merged into the merge tile. That is, in this embodiment, pieces of the second information as many as the number of tiles into which the picture is split are encoded.

Merge_flag may be used as information indicating whether each tile is merged. Merge_flag is encoded as 1 when indicating that a tile is merged, and 0 when not indicating that the tile is merged. In the example of FIG. 6, merge_flag is encoded with a value of 0000 0110 0110 0000.

An example of syntax elements according to this embodiment is shown in Table 4.

TABLE 4

```
pic_parameter_set_rbsp( )
  ...
  tiles_enabled_flag
  ...
  if( tiles_enabled_flag ) {
    num_tile_columns_minus1
    num_tile_rows_minus1
    uniform_spacing_flag
    if( !uniform_spacing_flag) {
      for( i=0; i < num_tile_columns_minus1□i++□ )
        column_width_minus1[ i ]
      for( i=0; i < num_tile_rows_minus1;i++ )
        row_height_minus1[ i ]
```

TABLE 4-continued

```
    }
    merge_tile_enabled_flag
    if(merge_tile_enabled_flag) {
      for( i=0; i < (num_tile_columns_minus1+1) ×
        (num_tile_rows_minus1+1); i++ )
        merge_flag[ i ]
    }
    loop_filter_across_tiles_enabled_flag
  }
```

Embodiment #4

FIG. 8 is an exemplary diagram marking identification information of tiles on a picture including a plurality of merge tiles. Unlike Embodiment #1 (see FIG. 5), a plurality of merge tiles is generated in this embodiment.

FIG. 8 illustrates a case where a picture is split into 16 tiles of the same size, and tile indexes from 0 to 15 are assigned to the respective tiles as identification information. In this case, a first merge tile is generated by merging tiles 0, 1, 4 and 5, and a second merge tile is generated by merging tiles 10, 11, 14 and 15.

In this embodiment, the video encoding apparatus encodes merge_tile_enabled_flag with the indication of On as the first information indicating that some of a plurality of tiles should be merged. The apparatus encodes identification information of the start and end tiles for each merge tile as the second information indicating the tiles to be merged into the corresponding merge tile. That is, the identification information of the start tile and the end tile are encoded as many as the number of merge tiles in the picture. The video encoding apparatus of this embodiment may additionally encode third information num_merge_tile_minus1 indicating the number of one or more generated merge tiles.

The identifier topleft_tile_id of the top left tile may be encoded as the identification information of the start tile among the tiles to be merged into each merge tile, and the identifier bottomright_tile_id of the bottom right tile may be encoded as the identification information of the end tile for each merge tile. In the example of FIG. 8, the identification information is encoded as num_merge_tile_minus1=1, {First merge tile: topleft_tile_id=0, bottomright_tile_id=5}, and {Second merge tile: topleft_tile_id=10, bottomright_tile_id=15}. However, this is merely an example, and various syntax elements that can define the start and end tiles may be used. For example, among the tiles to be merged, the identifier of the top right tile may be used as the identification information of the start tile, and the identifier of the bottom left tile may be used as the identification information of the end tile.

An example of syntax elements according to this embodiment is shown in Table 5.

TABLE 5

```
pic_parameter_set_rbsp( ) {
  ...
  tiles_enabled_flag
  ...
  if( tiles_enabled_flag ) {
    num_tile_columns_minus1
    num_tile_rows_minus1
    uniform_spacing_flag
    if( !uniform_spacing_flag) {
      for( i=0; i < num_tile_columns_minus1□i++ )
        column_width_minus1[ i ]
      for( i=0; i < num_tile_rows_minus1;i++ )
```

TABLE 5-continued

```
      row_height_minus1[ i ]
    }
  merge_tile_enabled_flag
  if(merge_tile_enable_flag) {
    num_merge_tile_minus1
    for( i=0; i < (num_merge_tile_minus1 + 1); i++ ) {
      topleft_tile_id[ i ]
      bottomright_tile_id[ i ]
    }
  }
  loop_filter_across_tiles_enabled_flag
}
```

Embodiment #5

FIG. 9 is an exemplary diagram marking position information of tiles on a picture including a plurality of merge tiles.

FIG. 9 illustrates a case where two merge tiles are generated from a picture split into 16 tiles of the same size, and shows position information about each tile. For example, position information about a tile may be represented by coordinates (u, v) based on the row and column of the tile. When the position of the top row is set to 0 (u=0) and the position of the leftmost column is set to 0 (v=0), the coordinates of the tiles may be sequentially presented as shown in FIG. 9. In this case, a first merge tile is generated by merging the tile at position (1, 0) and the tile at position (2, 0), and a second merge tile is generated by merging the tiles at positions (2, 2), (2, 3), (3, 2), and (3, 3).

In this embodiment, the video encoding apparatus encodes merge_tile_enabled_flag with the indication of On as the first information indicating that some of a plurality of tiles should be merged. The apparatus encodes position information about the start and end tiles among the tiles to be merged as the second information indicating the tiles merged into each merge tile. That is, pieces of the position information about the start and end tiles as many as the number of the merge tiles are encoded. The video encoding apparatus of this embodiment may additionally encode third information num_merge_tile_minus1 indicating the number of one or more generated merge tiles.

The position information about the top left tile (u_start_pos and v_start_pos) may be encoded as the position information about the start tile among the tiles merged into each merge tile, and the position information about the bottom right tile (u_end_pos and v_end_pos) may be encoded as the position information about the end tile. In the example of FIG. 9, the position information is encoded as num_merge_tile_minus1=1, {First merge tile: u_start_pos=0, v_start_pos=1, u_end_pos=0, v_end_pos=2}, and {Second merge tile: u_start_pos=2, v_start_pos=2, u_end_pos=3, v_end_pos=3}. However, this is merely an example, and various syntax elements that can define the start and end tiles may be used. For example, among the tiles to be merged, the position information about the top right tile may be used as the position information about the start tile, and the position information about the bottom left tile may be used as the position information about the end tile.

An example of syntax elements according to this embodiment is shown in Table 6.

TABLE 6

```
pic_parameter_set_rbsp( ) {
  ...
  tiles_enabled_flag
  ...
  if( tiles_enabled_flag ) {
    num_tile_columns_minus1
    num_tile_rows_minus1
    uniform_spacing_flag
    if( !uniform_spacing_flag) {
      for( i=0; i < num_tile_columns_minus1;i++ )
        column_width_minus1[ i ]
      for ( i=0; i < num_tile_rows_minus1;i++ )
        row_height_minus1[ i ]
    }
    merge_tile_enabled_flag
    if(merge_tile_enabled_flag) {
      num_merge_tile_minus1
      for( i=0; i < (num_merge_tile_minus1 + 1); i++ ) {
        u_start_pos[ i ]
        v_start_pos[ i ]
        u_end_pos[ i ]
        v_end_pos[ i ]
      }
    }
    loop_filter_across_tiles_enabled_flag
  }
}
```

The order of the syntax elements u_start_pos, v_start_pos, u_end_pos, v_end_pos is not necessarily set as shown in Table 3, but may be changed, if necessary.

Embodiment #6-1

FIG. 10 is an exemplary diagram marking information about whether each tile is merged and indexes of merge tiles, on a picture including a plurality of merge tiles.

In the example of FIG. 10, two merge tiles are generated from a picture split into 16 tiles of the same size. Also, i) information indicating whether a tile is merged into a merge tile is shown for each of the tiles into which the picture is split, and ii) an index of each of one or more merge tiles to which the tiles to be merged belong are shown in the figure.

In this embodiment, the video encoding apparatus encodes merge_tile_enabled_flag with the indication of On as the first information indicating that some of a plurality of tiles should be merged. The apparatus encodes information about each tile indicating whether the tile is merged into a merge tile as the second information indicating the tiles merged into the merge tile. That is, in this embodiment, pieces of the second information as many as the number of tiles into which the picture is split are encoded. The video encoding apparatus of this embodiment may additionally encode third information num_merge_tile_minus1 indicating the number of one or more generated merge tiles.

Merge_flag may be used as information indicating whether each tile is merged. Merge_flag is encoded as 1 when indicating that a tile is merged, and 0 when not indicating that the tile is merged.

In addition, for tiles which are merged among a plurality of tiles (tiles with merge_flag=1), the video encoding apparatus encodes an index merge_idx of a merge tile to which the tiles belong among one or more merge tiles. For example, the tile indexes merge_idx of the merge tiles may be encoded in a Truncated Unary (TU) manner, which takes the number of merge tiles in the picture as the maximum value. In the encoding in the TU manner, '0' and '1' are used as values of merge_idx when the number of merge tiles is 2, and '0', '10', and '11' are used as values of merge_idx when the number of merge tiles is 3.

In the example of FIG. 10, num_merge_tile_minus1=1, and information related to merge_flag and merge_idx is encoded as 0 10 10 0 0 11 11 0 0 11 11 0 0 0 0 0 for respective tiles into which are split from the picture.

An example of syntax elements according to this embodiment is shown in Table 7.

TABLE 7

```
pic_parameter_set_rbsp( ) {
    ...
    tiles_enabled_flag
    ...
    if( tiles_enabled_flag ) {
        num_tile_columns_minus1
        num_tile_rows_minus1
        uniform_spacing_flag
        if( !uniform_spacing_flag) {
            for( i=0; i < num_tile_columns_minus1;i++ )
                column_width_minus1[ i ]
            for( i=0; i < num_tile_rows_minus1;i++ )
                row_height_minus1[ i ]
        }
        merge_tile_enabled_flag
        if(merge_tile_enabled_flag) {
            num_merge_tile_minus1
            for( i=0; i < (num_tile_columns_minus1+1) ×
            (num_tile_rows_minus1+1); i++ ) {
                merge_flag[ i ]
                if(merge_flag[ i ])
                    merge_idx[ i ]
            }
        }
        loop_filter_across_tiles_enabled_flag
    }
```

Embodiment #6-2

Figure 11:
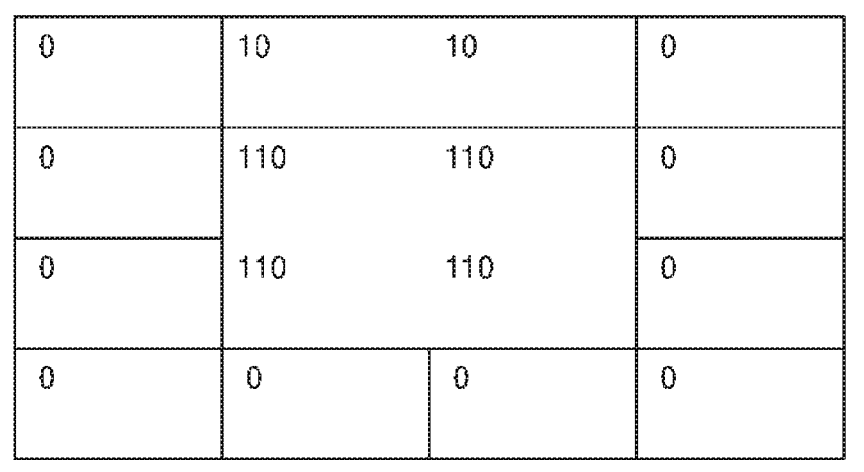

FIG. 11 is another exemplary diagram marking information about whether each tile is merged and indexes of merge tiles, on a picture including a plurality of merge tiles.

Unlike Table 7 in Embodiment #6-1, merge_idx may be encoded in the unary manner without encoding the number of merge tiles (num_merge_tile_minus1) (that is, without signaling to the video decoding apparatus). For example, '0' and '10' are used as values of merge_idx when the number of merge tiles is 2, and '0', '10', and '110' are used as values of merge_idx when the number of merge tiles is 3.

According to this embodiment, when a tile structure as shown in FIG. 10 is defined, information related to merge_flag and merge_idx is encoded with the value of 0 10 10 0 0 110 110 0 0 110 110 0 0 0 0 0 for respective tiles into which are split from the picture.

Embodiments of the present disclosure described above may be applied even to 360° video. For 360° video, in consideration of encoding efficiency, a region corresponding to the user's viewpoint may be processed with a high image quality, and the other regions may be encoded with a low image quality. In such case of encoding, the merge tiles proposed in the present disclosure can eliminate sensed difference between the tiles in the region viewed by the user.

Figure 12A:
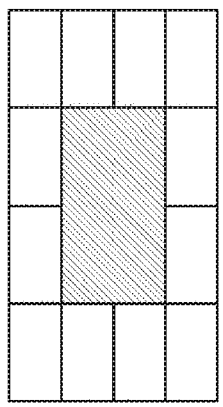
FIGS. 12A, 12B, and 12C illustrate exemplary merge tile scenarios for projection formats of 360° video.
Figure 12A:
Figure 12A:
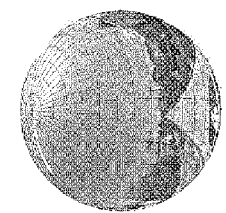
Figure 12B:
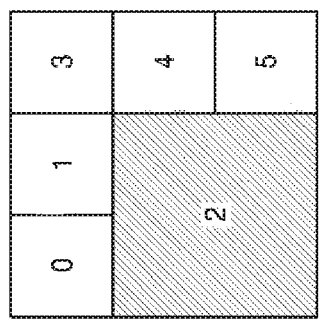
Figure 12B:
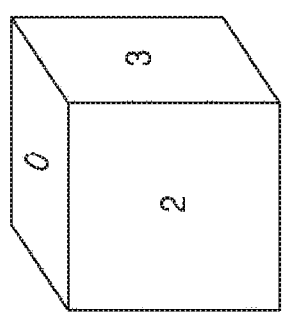
Figure 12B:
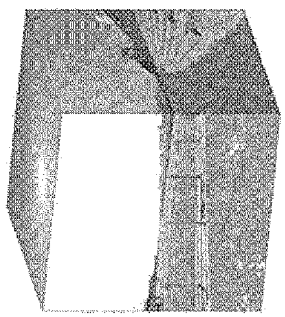
Figure 12C:
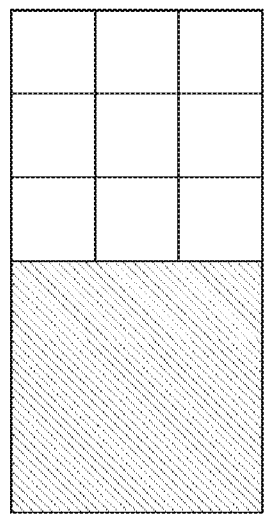
Figure 12C:
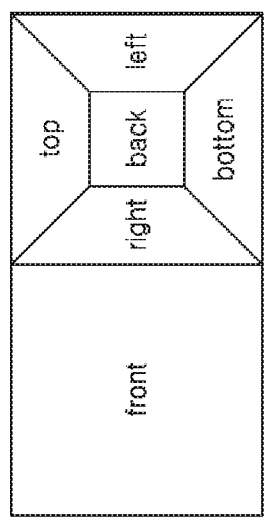
Figure 12C:
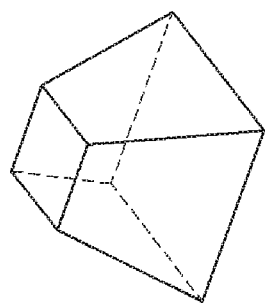

FIGS. 12A, 12B, and 12C illustrate exemplary merge tile scenarios for projection formats of 360° video. Specifically, FIG. 12A illustrates an example of applying merge tiles to an Equirectangular Projection format. FIG. 12B illustrates an example of applying merge tiles to a Cube Map Projection format. FIG. 12C illustrates an example of applying merge tiles to a Truncated Square Pyramid Projection format.

In each figure, the rightmost part shows an example of transforming 360° video into 2D video according to a projection format of the leftmost and middle parts of the figure. In the rightmost part, the hatched portion represents a region where the user's viewpoint stays and may be defined as a merge tile (i.e., one tile), and is encoded with a high image quality, and the other region may be split into multiple tiles and encoded with a low image quality.

Hereinafter, a video decoding apparatus and method according to an embodiment of the present invention will be described with reference to FIGS. 13 and 14.

Figure 13:
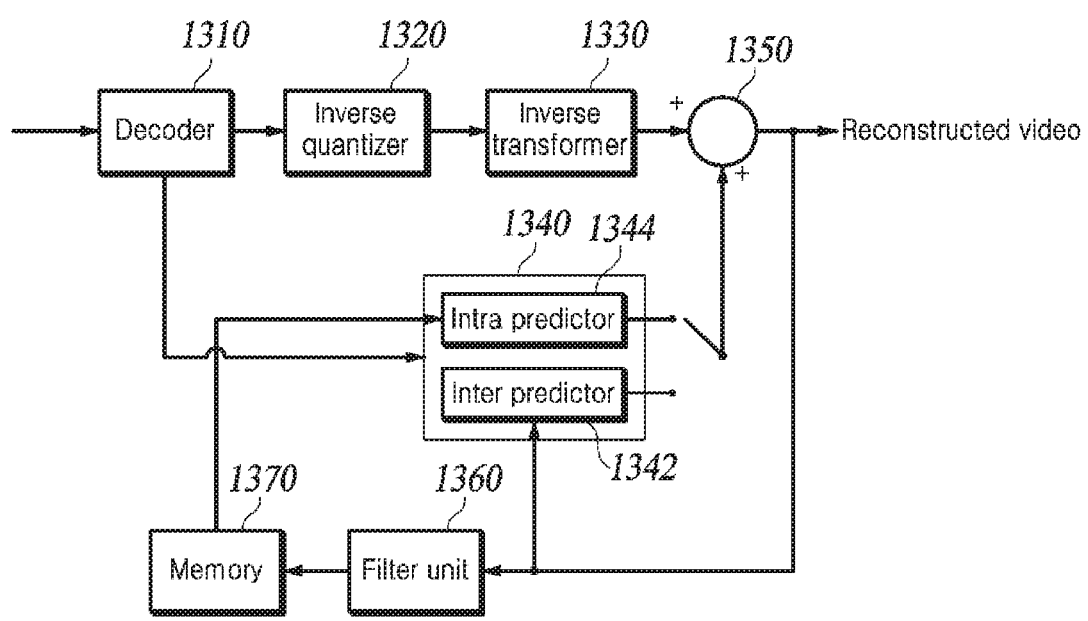
FIG. 13 is a block diagram of a video decoding apparatus according to an embodiment of the present disclosure.

FIG. 13 is a block diagram of a video decoding apparatus according to an embodiment of the present disclosure.

The video decoding apparatus includes a decoder 1310, an inverse quantization unit 1320, an inverse transformer 1330, a predictor 1340, an adder 1350, a filter unit 1360, and a memory 1370. The components shown in FIG. 15 may be implemented as a hardware chip, or may be implemented as software and a microprocessor may be implemented to execute the functions of the software corresponding to the respective elements.

The decoder 1310 splits a picture into a plurality of tiles by decoding a bitstream and extracting information related to the tile structure. In particular, the decoder 1310 defines an irregular or flexible tile structure by decoding, from the bitstream, merge information for merging some of a plurality of tiles into which the picture is split. Syntax elements related to the merge information may be decoded from one or more predetermined positions of a sequence parameter set (SFS), a picture parameter set (PPS), supplementary enhancement information (SEI), or a slice header. Detailed description thereof will be described later with reference to other drawings.

The decoder 1310 extracts prediction information and residual signal information necessary for reconstructing each tile including the merge tile. The decoder 1310 extracts information on a coding tree unit (CTU) size from a high level syntax such as an SPS or a PPS to determine the size of the CTU, and splits each tile into the CTU having the determined size. Then, the decoder determines the CTU as the uppermost layer of the tree structure, that is, the root node, and splits the CTU using the tree structure by extracting splitting information about the CTU.

Upon determining the current block to be decoded by splitting the tree structure, the decoder 1310 extracts information about a prediction type indicating whether the current block has been encoded by intra prediction or inter prediction. When the prediction type information indicates intra prediction, the decoder 1310 extracts syntax elements for intra prediction information (intra prediction mode) about the current block. When the prediction type information indicates inter prediction, the decoder 1310 extracts syntax elements for the inter prediction information.

Also, the decoder 1310 extracts information about quantized transform coefficients of the current block as information about the residual signal.

The inverse quantizer 1320 inversely quantizes the quantized transform coefficients. The inverse transformer 1330 transforms the inversely quantized transform coefficients from the frequency domain to the spatial domain to reconstruct residual signals, and therefore generate a residual block for the current block.

The predictor 1340 includes an intra predictor 1342 and an inter predictor 1344. The intra predictor 1342 is activated when the intra prediction is the prediction type of the current block, and the inter predictor 1344 is activated when the intra prediction is the prediction type of the current block.

The intra predictor 1342 determines the intra prediction mode of the current block among a plurality of intra prediction modes based on the syntax elements for the intra prediction mode extracted from the decoder 1310, and predicts the current block using references samples around the current block according to the intra prediction mode.

The inter predictor 1344 determines motion information about the current block using the syntax elements for the inter prediction mode extracted from the decoder 1310, and predicts the current block using the determined motion information.

The adder 1350 reconstructs the current block by adding the residual block output from the inverse transformer 1330 and the prediction block output from the inter predictor 1344 or the intra predictor 1342. The pixels in the reconstructed current block are utilized as reference samples in intra prediction of a block to be subsequently decoded.

The filter unit 1560 deblock-filters the boundaries between the reconstructed blocks in order to remove blocking artifacts caused by block-by-block decoding and stores the deblock-filtered blocks in the memory 1570. When all the blocks in one picture are reconstructed, the reconstructed picture is used as a reference picture for inter prediction of blocks in a subsequent picture to be decoded.

Hereinafter, a video decoding method for defining an irregular or flexible tile structure by generating one or more merge tiles by merging some of a plurality of tiles will be described in detail.

Figure 14:
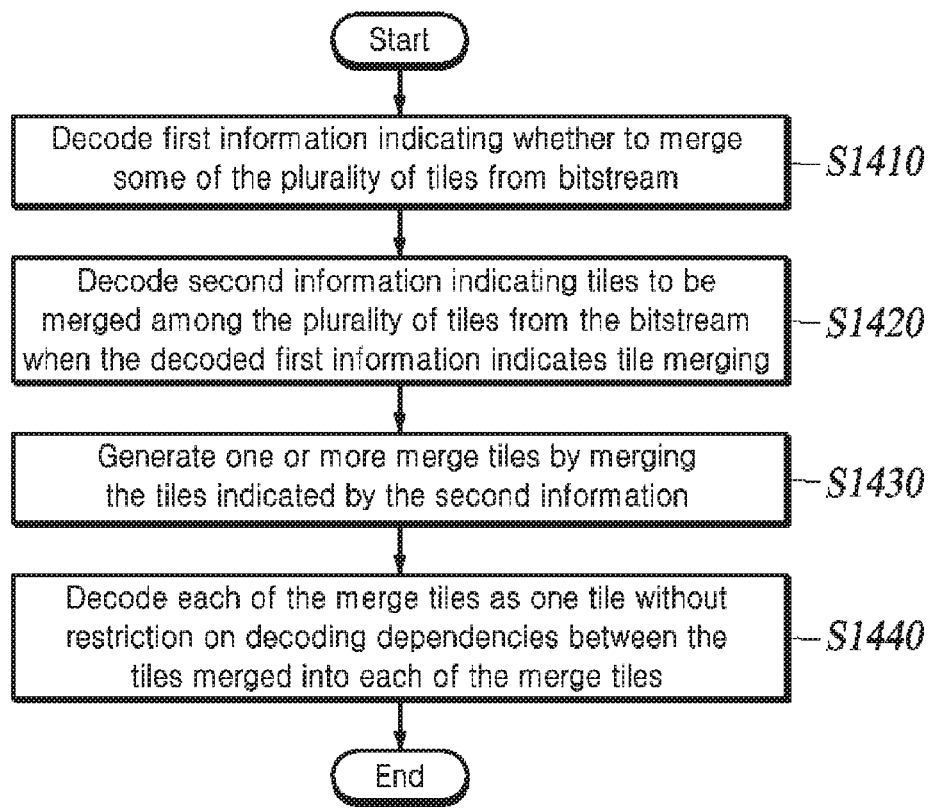
FIG. 14 is a flowchart illustrating operation of a video decoding apparatus according to an embodiment of the present disclosure.

FIG. 14 is a flowchart illustrating operation of a video decoding apparatus for decoding a picture split into a plurality of tiles according to an embodiment of the present invention.

The video decoding apparatus decodes first information indicating whether to merge some of a plurality of tiles from the bitstream (S1410). For example, as the first information, a flag merge_tile_enabled_flag indicating whether to merge a tile may be used. The flag merge_tile_enabled_flag is decoded as On when some tiles are merged. The flag merge_tile_enabled_flag is decoded as Off when there is no tile merged.

When the decoded first information indicates merging of tiles, the video decoding apparatus decodes, from the bitstream, second information indicating the tiles which are merged among the plurality of tiles (S1420). The second information may include, for each merge tile, i) identification information of the start and end tiles among the tiles merged into each merge tile, ii) position information about the start and end tiles among the tiles merged into each merge tile, or iii) information indicating whether each of the plurality of tiles is merged. The second information may include iv) index information about each of one or more merge tiles into which tiles are merged. Specific examples of the second information will be described later with reference to other drawings.

The video decoding apparatus generates one or more merge tiles by merging the tiles indicated by the second information (S1430). Each generated merge tile is defined as one tile. In other words, tiles merged into each merge tile are not simply grouped while maintaining the characteristics thereof before the merging, but are merged into a single tile. For example, merging may be performed in a manner that a restriction on decoding dependencies between tiles merged into the merge tile is eliminated.

After generating one or more merge tiles, the video decoding apparatus decodes each merge tile as one tile without restriction on decoding dependencies between tiles merged into each merge tile. (S1440). Here, the decoding dependencies may include intra prediction dependency between the tiles merged into each merge tile. That is, the restriction on intra prediction dependency is eliminated between the tiles merged into the same merge tile.

The video decoding apparatus may additionally decode third information indicating the number of one or more generated merge tiles, The exemplary syntax elements for the merge tiles described above with reference to FIGS. 5 to 12 also apply to the video decoding apparatus and method. Hereinafter, the video decoding apparatus and method will be described in detail on the assumption that the first information merge_tile_enabled_flag, which indicates whether to merge some of the plurality of tiles into which a picture is split, is decoded as On.

Embodiment #1

FIG. 5 is an exemplary diagram marking identification information of tiles on a picture including a plurality of tiles among which some tiles are merged.

FIG. 5 illustrates a case where a picture is split into 16 tiles of the same size, and tile indexes from 0 to 15 are assigned to the respective tiles as identification information of the tiles. In this case, tile 5, tile 6, tile 9, and tile 10 are merged to generate one merge tile.

In this embodiment, the video decoding apparatus decodes merge_tile_enabled_flag with the indication of On, and accordingly decodes identification information of the start and end tiles among the tiles to be merged, as the second information indicating the tiles merged into a merge tile. When there is a plurality of merge tiles, the identification information of the start and end tiles are decoded for each of the merge tiles.

The identifier topleft_tile_id of the top left tile may be decoded as the identification information of the start tile, and the identifier bottomright_tile_id of the bottom right tile may be decoded as the identification information of the end tile. In the example of FIG. 5, the identification information is decoded as topleft_tile_id=5, bottomright_tile_id=10. However, this is merely an example, and various syntax elements that can define the start and end tiles may be used. For example, among the tiles to be merged, the identifier of the top right tile may be used as the identification information of the start tile, and the identifier of the bottom left tile may be used as the identification information of the end tile.

An example of syntax elements according to this embodiment is shown in Table 2 disclosed above.

Embodiment #2

FIG. 6 is an exemplary diagram marking position information of tiles on a picture including a plurality of tiles among which some tiles are merged.

In the example of FIG. 6, a picture is split into 16 tiles of the same size as in the case of FIG. 5, and tiles at the center of the picture are merged into one merge tile. This figure shows position information about the tiles in place of the identification information of the tiles. For example, position information about a tile may be represented by coordinates (u, v) based on the row and column of the tile. When the position of the top row is set to 0 (u=0) and the position of the leftmost column is set to 0 (v=0), the coordinate of the tiles may be sequentially presented as shown in FIG. 5.

In this embodiment, as the video decoding apparatus decodes merge_tile_enabled_flag with the indication of On, the apparatus decodes position information about the start and end tiles among the tiles to be merged as the second information indicating the tiles merged into a merge tile.

When there is a plurality of merge tiles, the position information about the start and end tiles are decoded for each of the merge tiles.

The position information about the top left tile (u_start_pos and v_start_pos) may be decoded as the position information about the start tile among the tiles merged into a merge tile, and the position information about the bottom right tile (u_end_pos and v_end_pos) may be decoded as the position information about the end tile. In the example of FIG. 6, the position information is decoded as u_start_pos=1, v_start_pos=1, u_end_pos=2, v_end_pos=2. However, this is merely an example, and various syntax elements that can define the start and end tiles may be used. For example, among the tiles to be merged, the position information about the top right tile may be used as the position information about the start tile, and the position information about the bottom left tile may be used as the position information about the end tile.

An example of syntax elements according to this embodiment is shown in Table 3 disclosed above. The order of the syntax elements u_start_pos, v_start_pos, u_end_pos, v_end_pos is not necessarily set as shown in Table 3, but may be changed, if necessary.

Embodiment #3

FIG. 7 is an exemplary diagram marking information about whether each tile is merged, on a picture including a plurality of tiles among which some tiles are merged.

In the example of FIG. 7, a picture is split into 16 tiles of the same size as in the case of FIGS. 5 and 6, and tiles at the center of the picture are merged into one merge tile. In addition, information indicating whether a tile is merged into a merge tile is shown for each of the tiles into which the picture is split.

In this embodiment, as the video decoding apparatus decodes merge_tile_enabled_flag with the indication of On, the apparatus decodes information about each tile indicating whether the tile is merged into a merge tile as the second information indicating the tiles merged into the merge tile. That is, in this embodiment, pieces of the second information as many as the number of tiles into which the picture is split are decoded.

Merge_flag may be used as information indicating whether each tile is merged. Merge_flag is decoded as 1 when indicating that a tile is merged, and 0 when not indicating that the tile is merged. In the example of FIG. 6, merge_flag is decoded with a value of 0000 0110 0110 0000.

An example of syntax elements according to this embodiment is shown in Table 4 disclosed above.

Embodiment #4

FIG. 8 is an exemplary diagram marking identification information of tiles on a picture including a plurality of merge tiles. Unlike Embodiment #1 (see FIG. 5), a plurality of merge tiles is generated in this embodiment.

FIG. 8 illustrates a case where a picture is split into 16 tiles of the same size, and tile indexes from 0 to 15 are assigned to the respective tiles as identification information. In this case, a first merge tile is generated by merging tiles 0, 1, 4 and 5, and a second merge tile is generated by merging tiles 10, 11, 14 and 15.

In this embodiment, as the video decoding apparatus decodes merge_tile_enabled_flag with the indication of On, the apparatus decodes identification information of the start and end tiles for each merge tile as the second information indicating the tiles merged into the merge tile. That is, the identification information of the start tile and the end tile is decoded as many as the number of merge tiles in the picture. The video decoding apparatus of this embodiment may additionally decode third information num_merge_tile_minus1 indicating the number of one or more generated merge tiles.

The identifier topleft_tile_id of the top left tile may be decoded as the identification information of the start tile among the tiles merged into each merge tile, and the identifier bottomright_tile_id of the bottom right tile may be decoded as the identification information of the end tile for each merge tile. In the example of FIG. 8, the identification information are decoded as num_merge_tile_minus1=1, {First merge tile: topleft_tile_id=0, bottomright_tile_id=5}, and {Second merge tile: topleft_tile_id=10, bottomright_tile_id=15}. However, this is merely an example, and various syntax elements that can define the start and end tiles may be used. For example, among the tiles to be merged, the identifier of the top right tile may be used as the tile identification information of the start tile, and the identifier of the bottom left tile may be used as the identification information of the end tile.

An example of syntax elements according to this embodiment is shown in Table 5 disclosed above.

Embodiment #5

FIG. 9 is an exemplary diagram marking position information of tiles on a picture including a plurality of merge tiles.

FIG. 9 illustrates a case where two merge tiles are generated from a picture split into 16 tiles of the same size, and shows position information about each tile. For example, position information about a tile may be represented by coordinates (u, v) based on the row and column of the tile. When the position of the top row is set to 0 (u=0) and the position of the leftmost column is set to 0 (v=0), the coordinates of the tiles may be sequentially presented as shown in FIG. 9. In this case, a first merge tile is generated by merging the tile at position (1, 0) and the tile at position (2, 0), and a second merge tile is generated by merging the tiles at positions (2, 2), (2, 3), (3, 2), and (3, 3).

In this embodiment, as the video decoding apparatus decodes merge_tile_enabled_flag with the indication of On, the apparatus decodes position information about the start and end tiles among the tiles to be merged as the second information indicating the tiles merged into each merge tile. That is, pieces of the position information about the start and end tiles as many as the number of the merge tiles are decoded. The video decoding apparatus of this embodiment may additionally decode third information num_merge_tile_minus1 indicating the number of one or more generated merge tiles.

The position information about the top left tile (u_start_pos and v_start_pos) may be decoded as the position information about the start tile among the tiles merged into each merge tile, and the position information about the bottom right tile (u_end_pos and v_end_pos) may be decoded as the position information about the end tile. In the example of FIG. 9, the position information is decoded as num_merge_tile_minus1=1, {First merge tile: u_start_pos=0, v_start_pos=1, u_end_pos=0, v_end_pos=2}, and {Second merge tile: u_start_pos=2, v_start_pos=2, u_end_pos=3, v_end_pos=3}. However, this is merely an example, and various syntax elements that can define the start and end tiles may be used. For example, among the tiles to be merged, the position information about the top right tile may be used as the position information about the start tile, and the position information about the bottom left tile may be used as the position information about the end tile.

An example of syntax elements according to this embodiment is shown in Table 6 disclosed above. The order of the syntax elements u_start_pos, v_start_pos, u_end_pos, v_end_pos is not necessarily set as shown in Table 3, but may be changed, if necessary.

Embodiment #6-1

FIG. 10 is an exemplary diagram marking information about whether each tile is merged and index of each merge tile, on a picture including a plurality of merge tiles.

In the example, of FIG. 10, two merge tiles are generated from a picture split into 16 tiles of the same size. Also, i) information indicating whether a tile is merged into a merge tile is shown for each of the tiles into which the picture is split, and ii) an index of each of one or more merge tiles to which the tiles to be merged belong are shown in the figure.

In this embodiment, as the video decoding apparatus decodes merge_tile_enabled_flag with the indication of On, the apparatus decodes information about each tile indicating whether the tile is merged into a merge tile as the second information indicating the tiles merged into the merge tile. That is, in this embodiment, pieces of the second information as many as the number of tiles into which the picture is split are decoded. The video decoding apparatus of this embodiment may additionally decode third information num_merge_tile_minus1 indicating the number of one or more generated merge tiles.

Merge_flag may be used as information indicating whether each tile is merged. Merge_flag is decoded as 1 when indicating that a tile is merged, and 0 when not indicating that the tile is merged.

In addition, for tiles which are merged among a plurality of tiles (tiles with merge_flag=1), the video decoding apparatus decodes an index merge_idx of a merge tile to which the tiles belong among one or more merge tiles. For example, the tile indexes merge_idx of the merge tiles may be encoded by the video encoding apparatus in a Truncated Unary (TU) manner, which takes the number of merge tiles in the picture as the maximum value. In the encoding in the TU manner, merge_idx is decoded as '0' and '1' a when the number of merge tiles is 2, and decoded as '0', '10', or '11' when the number of merge tiles is 3.

In the example of FIG. 10, num_merge_tile_minus1=1, and information related to merge_flag and merge_idx is decoded as 0 10 10 0 0 11 11 0 0 11 11 0 0 0 0 0 for respective tiles into which are split from the picture.

An example of syntax elements according to this embodiment is shown in Table 7 disclosed above.

Embodiment #6-2

FIG. 11 is another exemplary diagram marking information about whether each tile is merged and index of each merge tile, on a picture including a plurality of merge tiles.

Unlike Table 7 in Embodiment #6-1, the video encoding apparatus may encode merge_idx in the unary manner without encoding the number of merge tiles (num_merge_tile_minus1). In this case, the video decoding apparatus decodes merge_idx as '0' or '10' when the number of merge tiles is 2, and as '0', '10', or '110' when the number of merge tiles is 3.

According to this embodiment, when a tile structure as shown in FIG. 10 is defined, information related to merge_flag and merge_idx is decoded with the value of 0 10 10 0 0 110 110 0 0 110 110 0 0 0 0 0 for respective tiles into which are split from the picture.

According to the apparatus and method for encoding or decoding video according to embodiments of the present disclosure, tiles can be flexible formed based on the rows and columns in a picture, thereby addressing the issue of spacing at a tile boundary and degradation of encoding efficiency. In addition, in the case of virtual reality (VR) content supporting a view-port based layout, a region corresponding to an important view such as a user's viewpoint may be defined as a merge tile, thereby suppressing degradation of image quality due to presence of a plurality of tiles. On the other hand, regions to be processed in a general image quality may be defined as small-size tiles. Accordingly, video can be flexibly processed even when the important view is changed. Further, a high-quality region of the video and the audio direction at a position corresponding thereto may be synchronized with each other according to the position information (e.g., yaw, roll, pitch) defined according to a specific gaze.

While it is illustrated in FIGS. 4 and 14 that the respective processes are sequentially executed, embodiments are not limited thereto. In other words, the processes illustrated in FIGS. 4 and 14 may be executed in different order or executed in parallel. Accordingly, embodiments are not limited to the sequential order of FIGS. 4 and 14.

The video encoding or decoding method according to the embodiment illustrated in FIGS. 4 and 14 may be implemented by a computer program and recorded on a computer-readable recording medium. The computer-readable recording medium on which the program for implementing the video encoding or decoding method according to the embodiment is recorded includes all types of devices in which data readable by a computer system is stored.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereof.

The invention claimed is:

1. A video encoding method for encoding a picture split into a plurality of tiles, the method comprising:
encoding first information indicating whether to merge some of the plurality of tiles;
when the first information is encoded to indicate tile merging, generating a merge tile by merging some of the plurality of tiles, the merge tile being defined as one tile;
encoding second information to indicate which tiles among the plurality of tiles are merged into the merge tile, wherein the second information includes one of (1) identification information or position information of both a start tile and an end tile among the tiles merged into the merge tile and (2) information indicating whether the tile is merged for each of the plurality of tiles; and
encoding the merge tile as one tile without restriction on encoding dependencies between the tiles merged into the merge tile.

2. The method of claim 1, wherein the encoding dependencies comprise an intra prediction dependency between the tiles merged into each of the merge tiles.

3. A video encoding method for encoding a picture split into a plurality of tiles, the method comprising:
encoding first information indicating whether to merge some of the plurality of tiles;
when the first information is encoded to indicate tile merging, generating several merge tiles by merging some of the plurality of tiles, each of the merge tiles being defined as one tile;
encoding second information specifying a tile structure of the picture, wherein the second information comprises, for each of the merge tiles, identification information or position information of both a start tile and an end tile among the tiles merged into each of the merge tiles;
encoding third information indicating the number of the generated merge tiles; and
encoding each of the merge tiles as one tile without restriction on encoding dependencies between the tiles merged into each of the merge tiles.

4. A video encoding method for encoding a picture split into a plurality of tiles, the method comprising:
encoding first information indicating whether to merge some of the plurality of tiles;
when the first information is encoded to indicate tile merging, generating several merge tiles by merging some of the plurality of tiles, each of the merge tiles being defined as one tile;
encoding second information specifying a tile structure of the picture, wherein the second information comprises information indicating whether the tile is merged for each of the plurality of tiles and an index of one of the merge tiles into which each of tiles among the plurality of tiles is merged, and wherein the index of one of the merge tile is encoded in a truncated unary code;
encoding third information indicating the number of the generated merge tiles; and
encoding each of the merge tiles as one tile without restriction on encoding dependencies between the tiles merged into each of the merge tiles.

5. A video encoding method for encoding a picture split into a plurality of tiles, the method comprising:
encoding first information indicating whether to merge some of the plurality of tiles;
when the first information is encoded to indicate tile merging, generating several merge tiles by merging some of the plurality of tiles, each of the merge tiles being defined as one tile;
encoding second information specifying a tile structure of the picture, wherein the second information comprises (1) information indicating whether the tile is merged for each of the plurality of tiles and (2) an index of one of merge tiles into which each of the tiles merged among the plurality of tiles is merged, and wherein the index of one of the merge tile is encoded in a unary code; and
encoding each of the merge tiles as one tile without restriction on encoding dependencies between the tiles merged into each of the merge tiles.

6. A video decoding method for decoding a picture split into a plurality of tiles, some of the plurality of tiles being merged into a merge tile, the method comprising:
decoding first information indicating whether to merge some of the plurality of tiles from a bitstream;
when the decoded first information indicates tile merging, decoding second information indicating which tiles are to be merged among the plurality of tiles from the bitstream, wherein the second information includes one of (1) identification information or position information of both a start tile and an end tile among the tiles merged into a merge tile and (2) information indicating whether the tile is merged for each of the plurality of tiles;
generating the merge tile by merging the tiles indicated by the second information, the merge tile being defined as one tile; and
decoding the merge tile as one tile without restriction on decoding dependencies between the tiles merged into the merge tile.

7. The method of claim 6, wherein the decoding dependencies comprise an intra prediction dependency between the tiles merged into each of the merge tiles.

8. A video decoding method for decoding a picture split into a plurality of tiles, some of the plurality of tiles being merged into several merge tiles, the method comprising:
decoding first information indicating whether to merge some of the plurality of tiles from a bitstream;
when the decoded first information indicates tile merging, decoding second information which specifies a tile structure of the picture and third information which indicates the number of the merge tiles from the bitstream, wherein the second information comprises, for each of the merge tiles, identification information or position information of both a start tile and an end tile among the tiles merged into each of the merge tiles;
generating the merge tiles by merging the tiles indicated by the second information and the third information, each of the merge tiles being defined as one tile; and
decoding each of the merge tiles as one tile without restriction on decoding dependencies between the tiles merged into each of the merge tiles.

9. A video decoding method for decoding a picture split into a plurality of tiles, some of the plurality of tiles being merged into several merge tiles, the method comprising:
decoding first information indicating whether to merge some of the plurality of tiles from a bitstream;
when the decoded first information indicates tile merging, decoding second information which specifies a tile structure of the picture, wherein the second information comprises (1) information indicating whether the tile is merged for each of the plurality of tiles and (2) an index of one of merge tiles into which each of the tiles merged among the plurality of tiles is merged, and wherein the index of one of the merge tile is encoded in a unary code;
generating the merge tiles by merging the tiles indicated by the second information, each of the merge tiles being defined as one tile; and
decoding each of the merge tiles as one tile without restriction on decoding dependencies between the tiles merged into each of the merge tiles.

10. A video decoding method for decoding a picture split into a plurality of tiles, some of the plurality of tiles being merged into several merge tiles, the method comprising:
decoding first information indicating whether to merge some of the plurality of tiles from a bitstream;
when the decoded first information indicates tile merging, decoding second information which specifies a tile structure of the picture and third information indicating the number of the one or more generated merge tiles from the bitstream, wherein the second information comprises information indicating whether the tile is merged for each of the plurality of tiles and an index of one of the merge tiles into which each of tiles among the plurality of tiles is merged, and wherein the index of one of the merge tile is encoded in a truncated unary code;

generating the merge tiles by merging the tiles indicated by the second information and the third information, each of the merge tiles being defined as one tile; and decoding each of the merge tiles as one tile without restriction on decoding dependencies between the tiles merged into each of the merge tiles.

* * * * *